US006377006B1

(12) United States Patent
Dawson et al.

(10) Patent No.: US 6,377,006 B1
(45) Date of Patent: Apr. 23, 2002

(54) METHOD AND APPARATUS FOR PREVENTING THE UNAUTHORIZED OPENING OF AN ELECTRONIC LOCK

(75) Inventors: Gerald Dawson; David Wolterman; Mike Kelly, all of Lexington, KY (US)

(73) Assignee: Kaba Mas Corporation, Lexington, KY (US)

( * ) Notice: Subject to any disclaimer, the term of this patent is extended or adjusted under 35 U.S.C. 154(b) by 0 days.

(21) Appl. No.: 09/637,834

(22) Filed: Aug. 11, 2000

(51) Int. Cl.[7] ............................ H02P 1/22; E05B 49/00

(52) U.S. Cl. ........................ 318/293; 318/290; 318/293; 361/193; 361/201; 70/278

(58) Field of Search ................................ 318/280–293, 318/600–630, 483, 266; 70/278, 284, 279; 340/825.32, 825.31, 825.17, 547; 361/172, 193, 201, 205

(56) References Cited

U.S. PATENT DOCUMENTS 3,746,954 A * 7/1973 Myles et al.
4,060,846 A * 11/1977 Conn
4,686,912 A * 8/1987 Fogleman et al.
4,810,944 A * 3/1989 Chance
4,908,554 A * 3/1990 Chance
5,083,122 A * 1/1992 Clark
5,347,267 A * 9/1994 Murray
5,410,301 A * 4/1995 Dawson et al.
5,563,586 A * 10/1996 Baun et al.
5,709,114 A * 1/1998 Dawson et al.
5,873,276 A * 2/1999 Dawson et al.

* cited by examiner

*Primary Examiner*—Paul Ip
(74) *Attorney, Agent, or Firm*—Arent Fox Kintner Plotkin & Kahn PLLC; Rustan J. Hill

(57) ABSTRACT

The present invention is an electronic lock having a shorting or shunt circuit designed to allow an authorized operator to open the electronic lock and which will prevent an unauthorized operator from opening the lock when authorized combination has not been entered.

13 Claims, 4 Drawing Sheets

METHOD AND APPARATUS FOR PREVENTING THE UNAUTHORIZED OPENING OF AN ELECTRONIC LOCK

FIELD OF THE INVENTION

This invention relates to the field of devices for preventing covert opening of electronic locks, and more specifically, relates to an electronic circuit that will prevent opening the lock by the unauthorized application of power to the electronic lock.

DESCRIPTION OF THE RELATED ART

Many safes, security containers, and/or vaults have electronic combination locks installed thereon. These locks are subject to attack in an effort to open the lock. Attacks may range from the destruction of the lock itself, an attack such that the operator can not detect that the lock has been attacked, violated, or compromised, and further to an attack such that an expert can not detect that the lock has been violated or compromised.

One particular method of attack to which electronic combination locks are particularly susceptible is an attack by an insider who has an authorized combination to the lock but who also wishes to have unauthorized access to the lock. This type of person, since they have an authorized combination, would when the lock is open, have access to the portions of the lock that are contained in the secured area when the lock is closed. Having access to this part of the lock provides the opportunity for tampering with the lock. One type of tampering to which electronic locks are particularly susceptible is wiring and/or providing an alternate power supply to the lock, which could be operated from outside the security container. Typically, this may be accomplished by providing electric power directly to the electric actuator employed in the lock, usually a motor or solenoid, which positions the bolt or which permits/conditions the lock to be opened by further operator action. Thus, it is desirable to have an electronic circuit and/or method that prevents the unauthorized opening of the lock through providing an unauthorized power source to the lock.

SUMMARY OF THE INVENTION

The present invention solves the problem discussed above and is a shorting or shunt circuit designed to allow an authorized operator to provide power to the electronic lock and which will prevent an unauthorized operator from opening the lock when an authorized combination has not been entered.

BRIEF DESCRIPTION OF THE DRAWINGS

The accompanying drawings incorporated in and forming part of the specification illustrates several aspects of the present invention, and together with the description serves to explain the principles of the invention. In the drawings.

Reference will now be made in detail to the present preferred embodiment invention, examples, which are illustrated, in the accompanying drawing.

DESCRIPTION OF PREFERRED EMBODIMENT

Overview

Electronic locks and electronic combination locks in particular are susceptible to tampering by a person who has access to the lock case after the lock has been opened. Electronic combination locks may most easily be tampered with by providing power to the electric actuator that either physically repositions the bolt or places the lock in condition where an operator may withdraw the bolt.

To tamper with the lock in this fashion, the back cover of the lock must be removed. Then one or more conductors are connected to the electronic actuator and the conductor(s) run outside the secured container so that by providing electrical power to the conductor(s) the electric actuator would be energized so that the lock may be opened. The present invention prevents this application of electrical power from causing the lock to open or be placed in a condition where a user may open a lock. This is accomplished by using a low resistance shunt or short across the leads of the electric actuator. When an authorized combination is entered the shunt or short is opened so that the electric actuator may perform as designed.

Detailed Description

Figure 1:
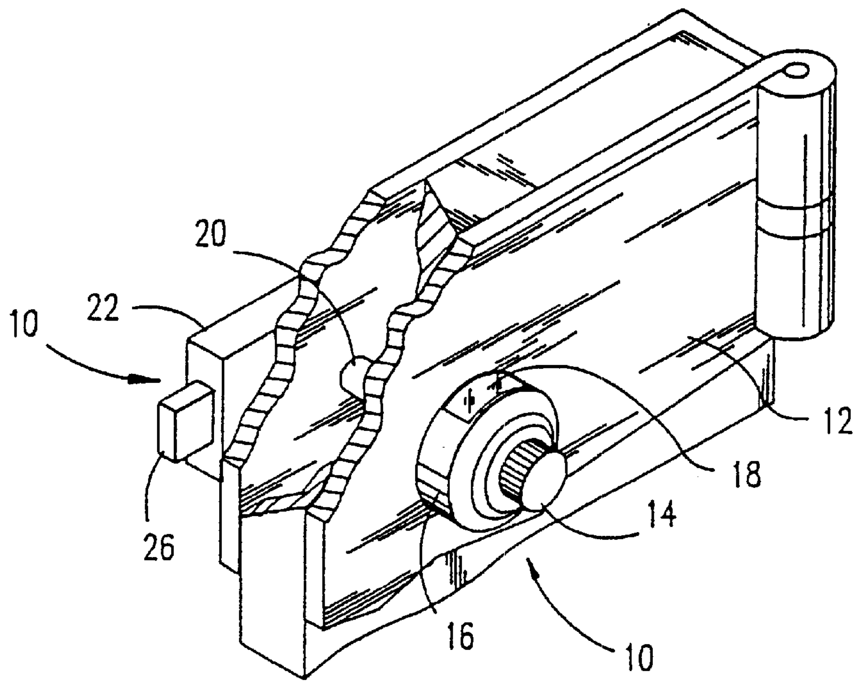
FIG. 1 illustrates an exemplary lock in accordance with the present invention.

Referring to FIG. 1, an exemplary electronic lock of the type employing this invention is indicated as a lock 10, mounted on safe or vault door 12. Lock 10 may employ a knob 14 for dialing or entering combinations into lock 10, a knob housing 16 and a display 18. Shaft 20 may extend from knob 14 to the lock mechanism housing 22. Extending from the lock mechanism housing 22 and retractable into lock housing 22 is a bolt 26, which must be withdrawn to allow door 12 to swing open and permit access to the secure area. Other embodiments of electronic lock 10 the knob 14 may be replaced with a keypad. In further embodiment of the lock 10 display 18 or a shaft 20 may be omitted. Even when a shaft 20 is not present one or more wires and/or conductors are typically utilized to connect the knob 14, keypad or front portions of the lock exterior to the safe or vault to the lock case in 22. The lock illustrated in FIG. 1 utilizes energy developed by rotating knob 14 to power the lock. Other embodiments of lock 10, which utilize other power sources, such as line power or batteries, are within the scope of this disclosure as discussed below.

Figure 2:
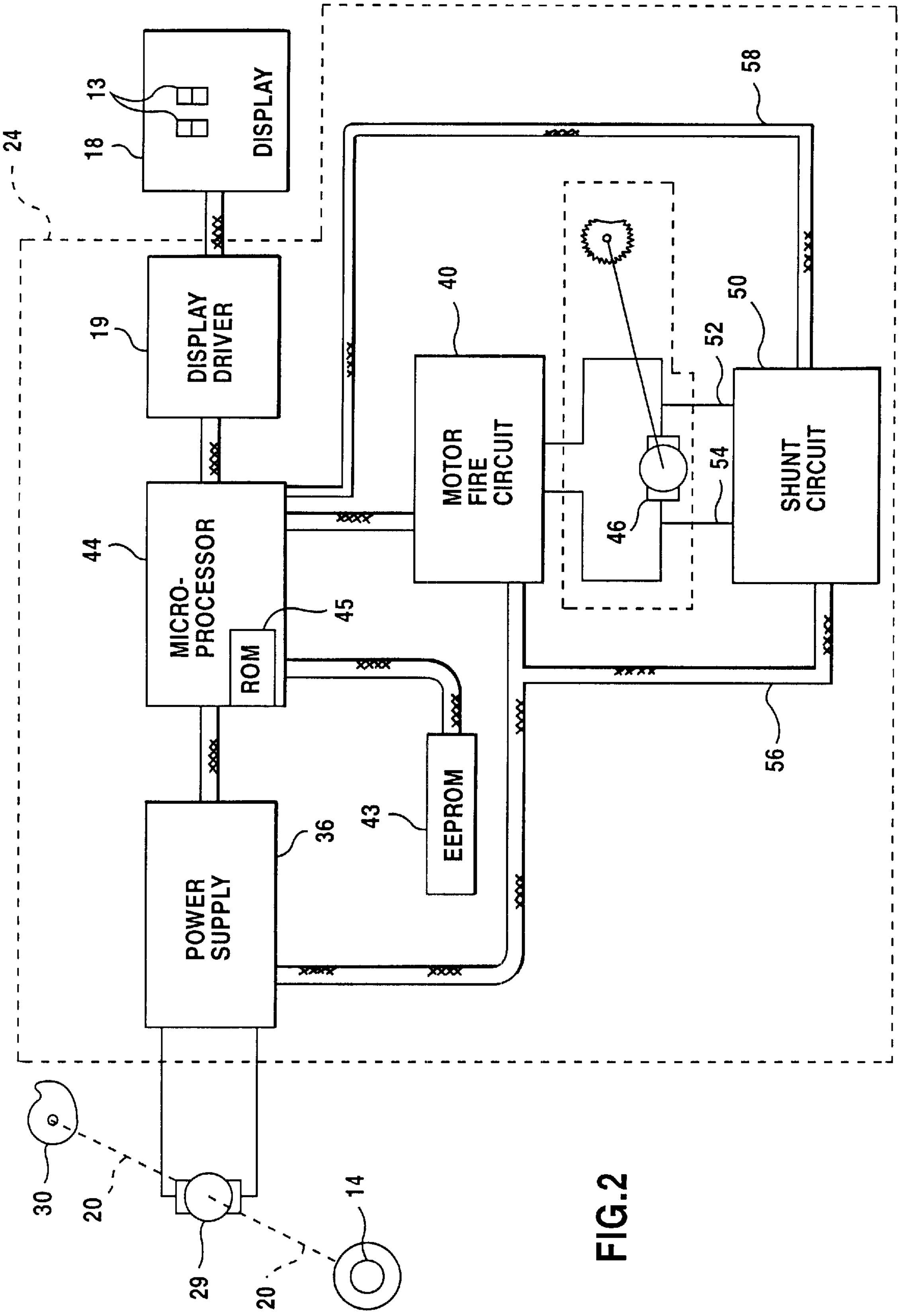
FIG. 2 illustrates a block diagram of an electronic circuit that may be employed in the lock of FIG. 1.

Referring now to FIG. 2, the knob 14 may be connecting to a generator 29 and to the retractor drive cam 30 with shaft 20. The generator 29 may be a stepper motor driven as a generator. Alternatively, generator 29 could be any other method of generating electrical power through movement of knob 14. As the generator 29 is driven by knob 14 and shaft 20, the series of electrical pulses are generated and feed to the power supply 36 for rectification and shaping. The shaping the pulses accomplish by circuitry that is conventional and forms no part of this invention. The electrical pulses may also be feed to the microprocessor 44. These pulses, if provided to microprocessor 44, are out of phase so that they may be employed to determine the direction of the rotation of knob 14.

The electronic controls 24 of lock 10 are typically contained in the lock casing 22 that is installed in the secure area of the vault or safe. The electronic controls typically contain a power supply 36 that supplies power to a microprocessor 44 and the actuator circuit 40 that causes an electronic actuator 46 to withdraw or extend bolt 26 or to place the lock 10 in a condition whereby the operator may manually withdraw or extend bolt 26. Additionally, in some embodiments power supply 36 may supply power to operate a shunt circuit 50.

Power supply 36 may be any circuit that is capable of converting the electrical power provided to lock 10 to a form (AC and/or DC) and voltage that can be utilized by the electrical components employed in lock 10. The source of electric power may be a generator 29, as discussed above; a battery; or line.

Typically, microprocessor 44 contains some internal read only memory 45 and may in some embodiments communicate with an electronic erasable programmable read only memory (EEPROM) 43. The erasable electronic programmable read only memory 43 enables the program running in the microprocessor to change, store and save data about a particular user or the lock in general. As an alternative to microprocessor 44 an integrated circuit specially designed to perform the functions required of a specific lock could be utilized. Microprocessor 44 provides signals to the electric actuator firing circuit 40 and to the shunt circuit 50. Additionally, the microprocessor may provide data to the display drive 19, which would drive an external display 18. The use of an external display 18 together with the display driver 19 is optional. The use of an external display however, provides for easier feedback and operator use.

Typically, a solenoid or electric motor is employed as the electric actuator 46. Any electric device that could withdraw and/or extend the bolt or place the lock in a condition whereby the operator may open the lock may be utilized for actuator 46.

The power supply 36, microprocessor 44, and the circuitry shown in block diagram shown in FIG. 2, with the exception of shunt circuit 50 and its connections 52, 54, 56 and 58, illustrate circuits that exist in the prior art. Consequently, only the shunt circuit 50 together with its connections 52, 54, 56, and 58 will be discussed in detail.

Figure 3:
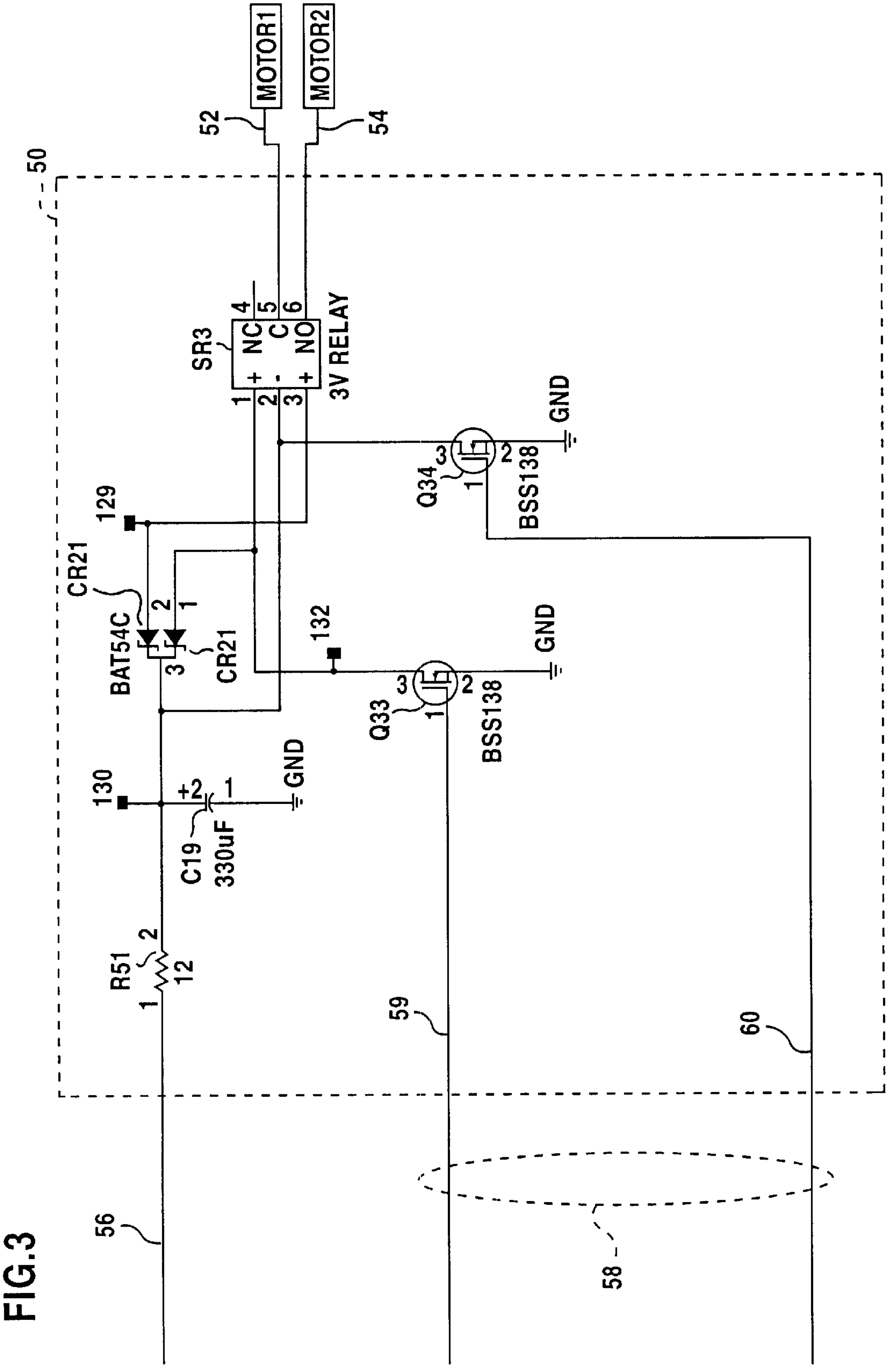
FIG. 3 provides an exemplary electrical shunt circuit shown in FIG. 2

FIG. 3 illustrates the preferred shunt circuit 50. The shunt circuit shown employs a relay SR3. If it is desired to minimize the power consumption of the circuits utilized, then it is preferred that the relay SR3 is a latching relay. The use of a latching relay enables the relay to be placed in the open or closed position without continuously holding the relay in that position. Alternatively, any electronically controlled switching device, such as a transistor, bipolar and/or SCR may be utilized. It is preferred that the switching device selected has a low resistance across the device when the device shunts current around or shorts electronic actuator 46 through connectors 52 and 54. The higher the resistance from the lead 52 through the relay SR3 or other switching device to lead 54 the larger the voltage created across the switching device for a given current and consequently a smaller total current would be required to develop operating power in electric actuator 46. Consequently, it is desirable to select a relay SR3 or switching device such that the relay SR3 or switching device would fail due to over current prior to developing operating power in actuator 46. Additionally, it is also desired that the current required to fail the relay SR3 or switching device also cause a failure in the electric actuator 46 if the relay SR3 or other switching device fails in the open position so that the lock fails in the locked or closed position. In other embodiments it may be desirable to select the relay SR3 or switch and actuator 46 such that the actuator 46 fails due to over current (current heating) but without operating prior to the relay SR3 or switch failing due to excessive current.

Shunt circuit 50 also utilizes in the preferred embodiment a capacitor C19 that stores sufficient electrical energy to reposition the relay, at least once, and in the most preferred embodiment, twice. The use of capacitor C19 is optional, however the use of this capacitor ensures that there is sufficient energy in the electronic circuitry 24 to reposition the relay SR3 to the shut or shunt position after operating actuator 46.

The shunt circuit 50 may utilize two transistors Q33 and Q34 as switching devices to reposition relay SR3 when relay SR3 is a latching relay. If non-latching relay were utilized in place of the latching relay, then only a single transistor or switch would be required in the preferred embodiment. Each transistor Q33 and Q34 is connected with traces and/or leads 59 and 60 to microprocessor 44 through wire/connector 58. Typically, these leads 59 and 60 would each be connected to separate IO port of the microprocessor.

In operation, when the microprocessor, through the operation of software and/or firmware running in the microprocessor sets the particular IO port high or sets the IO port to one, then the port voltage typically would go high. Consequently, turning on the associated transistor Q33 or Q34 or switch that provides a current flow path from either the power supply through line 56 and/or from capacitor C19, if utilized, through the coil in the relay and the transistor Q33 or Q34 or switch to ground. Thus, the relay SR3 or switch may be opened or closed. Therefore, with the lock in the secured position with the bolt 26 extended, when the user enters an authorized combination and the microprocessor sends a signal to the electronic actuator firing circuit 40 the microprocessor would also send a signal to the appropriate transistor in this case Q34, that will permit current to flow or switch, to shift the relay SR3 or switch to open position. Thus, removing the short or shunt from the electronic actuator 46 such that the electronic actuator firing circuit 40 would be effective in providing power to the electronic actuator 46.

If relay SR3 is a non-latching relay, preferably this relay would be a normally closed relay so that electric power needed to be provided to hold the relay in the open position after an authorized combination and/or key was utilized. In this event only a single transistor, switch, or bipolar would be required to activate the relay SR3 or switch. In some embodiment it may be possible for the microprocessor port to provide sufficient current to operate the relay. In this instance, the transistor or switch and the power source may be omitted.

Figure 4:
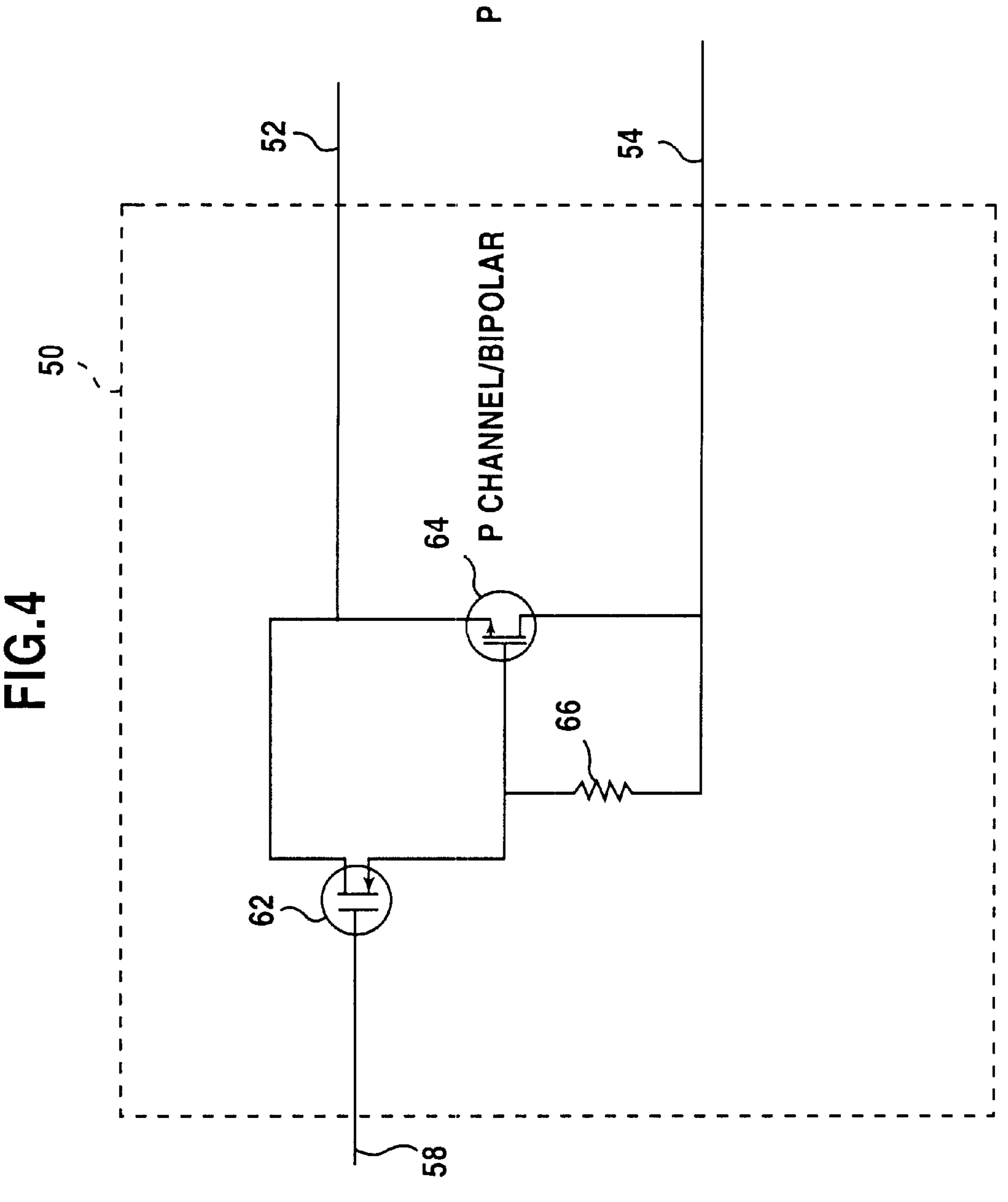
FIG. 4 provides a second exemplary electrical shunt circuit shown in FIG. 2.

With reference now to FIG. 4 illustrating a second embodiment of shunt circuit 50. This circuit illustrates replacing relay SR3 with a semiconductor switch 64, such as a P channel transistor, bipolar or similar integrated switching device. In this case, the gate and the drain are shown connected by a resistor 66. By maintaining the gate and the drain at the approximate same voltage, the application of a positive voltage or voltage higher on line 52 than on line 54 would cause switch 64 to conduct. Thus, if the resistance across lines 52 and 54 and through switch 64 was sufficiently low the circuit would shunt the electricity around or short electronic actuator 46. To turn switch or transistor 64 off so that electronic actuator 46 may be operated a single control line or lead 58 is utilized connecting to a port on microprocessor 44. When this port is turned on or goes high, switch 62, typically a transistor, turns on or conducts, permitting the high voltage on line 52 to be applied to the gate of transistor 64. By applying a high voltage of the gate of transistor 64 this causes transistor 64 to open or stop conducting thereby disabling shunt circuit 50 and enabling actuator circuit 40 to provide power to electronic actuator 46 whereby the lock may be opened. When the microprocessor sets the port to 0 line 58 would go low resulting in switch 62 opening and switch 64 closing.

The foregoing is a description of the preferred embodiment of the invention. It is recognized that changes and modifications may be made to the embodiments of the invention disclosed without the departing from the scope and spirit of the invention, such changes and modifications reside within the scope of the claims below:

In summary, numerous benefits have been described which result from employing the concepts of the invention. The foregoing description the preferred embodiment of the invention has been prepared for the purposes of illustration and description. It is not intended to be exhaustive or to limit the invention to the precise form disclosed. Obvious modifications or variations are possible in light of the above teaching. The embodiment was chosen and described in order to best illustrate the principles of the invention in its practical application to thereby enable one of ordinary skill in the art to best utilize the invention of various embodiments and with various modifications as they are suited to the particular use contemplated. It is intended that the scope of the invention be defined by the claims appended hereto.

We claim:

1. An electronic lock, said lock comprising:

a lock case;

a bolt carried by the lock case;

an electronic actuator, the actuator enables the bolt to be withdrawn into the lock case upon receipt of an electric signal; and an electronic shunt, the shunt diverts the electric signal from the actuator unless a valid combination is entered into the electronic lock, whereby the actuator does not enable bolt withdrawal unless a valid combination is entered into the lock.

2. A method for operating an electronic lock, said method comprising:

shorting an electric actuator; said short preventing operation of said electric actuator and thus prevents withdrawal of bolt;

receiving an authorization signal; and upon receipt of said authorization signal, clearing said short, and permitting said electric actuator to withdraw said bolt.

3. The method of claim 2 where said electric actuator is an electric motor.

4. The method of claim 2 where said electric actuator is a solenoid.

5. The method of claim 2 wherein said shorting occurs upon receipt of an unauthorized application of electric power to said electric actuator.

6. The method of claim 2 wherein said shorting occurs upon the application of electric power to said electric actuator; and clearing said shorting upon receipt of said authorization signal.

7. The method of claim 6 where said clearing is active for a predetermined time period.

8. A method for operating an electronic lock, said method comprising:

shorting an electric actuator that permits bolt movement, said short preventing operation of said electric actuator, and thereby preventing withdrawal of said bolt;

receiving an authorization signal; and upon receipt of said authorization signal, clearing said short and permitting operation of said electric actuator, whereby said bolt may be placed in condition for opening.

9. The method of claim 8 where the electric actuator is a solenoid.

10. The method of claim 8 where the electric actuator is an electric motor.

11. The method of claim 8 wherein said shorting occurs upon receipt of an unauthorized application of electric power to said electric actuator.

12. The method of claim 8 wherein said shorting occurs upon the application of electric power to said electric actuator; and clearing said shorting upon receipt of said authorization signal.

13. The method of claim 12 wherein said clearing is active for a predetermined time period.

* * * * *